Nov. 23, 1937.  W. A. PARKS  2,100,170
ADJUSTABLE SEAT
Filed Oct. 4, 1935

INVENTOR.
Walter A. Parks
BY
Morrell, Lieber & Morrell
ATTORNEYS.

Patented Nov. 23, 1937

2,100,170

UNITED STATES PATENT OFFICE 2,100,170

ADJUSTABLE SEAT

Walter A. Parks, Milwaukee, Wis.

Application October 4, 1935, Serial No. 43,549

3 Claims. (Cl. 155—14)

The present invention relates generally to improvements in adjustable seats, and relates more specifically to the construction of angularly adjustable seat structures especially adapted for use in land, air, and water vehicles.

Heretofore vehicle seats have been shiftable rectilinearly under the control of releasable locking mechanism merely to vary the distance from the vehicle controls. These prior structures, however, made no provision for angular adjustment to decentralize the effect of gravity on the human body and thereby failed to fully meet changing comfort requirements for different people and for different driving conditions.

Generally defined, an object of the present invention is to provide an improved adjustable seat which is simple in construction and highly effective in use.

Some of the more specific objects of the invention are as follows:

To provide an improved seat structure which can be readily angularly adjusted by the occupant and maintained in the desired position of adjustment.

To provide a seat assemblage which is movable along a predetermined curved path in order to vary the angle of reclination of the user, and to facilitate entry and exit to and from the seat.

To provide a new and useful automatically adjustable seat especially adapted for use in a vehicle such as an aeroplane, automobile, railway coach, or launch.

To provide a seat support for vehicle enclosures, which will facilitate air conditioning and ventilation within the enclosure, and which also provides maximum available storage space.

To provide an improved seat which may be either angularly adjusted relative to its normal support, or tilted bodily with its support, or shifted rectilinearly with its supporting structure.

To provide a longitudinally adjustable seat having a support which automatically frictionally maintains the seat in various positions of adjustment.

To provide a seat support which occupies a minimum of space above the floor to cooperate with present day vehicles of restricted head room.

To provide a seat structure which is inexpensive to manufacture, strong and durable, fool proof, and well adapted for the purpose described.

With the above and other objects in view, the invention consists of the improved adjustable seat and all its parts and combinations, as set forth in the claims, and all equivalents thereof.

In the accompanying drawing, illustrating one complete embodiment of the preferred form of the invention and showing its use as applied to automotive vehicles, in which the same reference numerals designate the same parts in all of the views.

Figure 1:
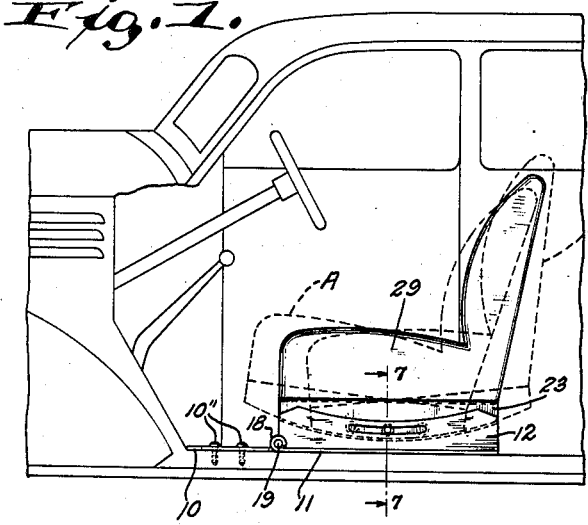
Fig. 1 is a side elevational view of the improved seat showing it in association with a portion of an automobile, the dotted lines indicating positions of adjustable movement.

Referring more particularly to the drawing, the base members, of which there are preferably two for each seat, each comprise a normally fixed plate 10 and a hinged portion 11. Each of the plates 10 may be formed with slots 10' through which adjustment screws or bolts 10'' may extend to adjustably secure the plate to the floor board. It is apparent that by loosening the screws or bolts 10'', that the plates 10 may be adjusted toward or away from the vehicle controls. While, it has been preferred to illustrate a screw and slot arrangement herein, for purposes of simplicity, it is to be understood that any other suitable adjusting means may be employed. In addition, certain adaptations of the invention may not require the longitudinal adjustment of the plate 10, and in such instances, the plates may be non-adjustably secured to the floor board or other foundation structure, see Figs. 1, 2, and 3.

Figure 3:
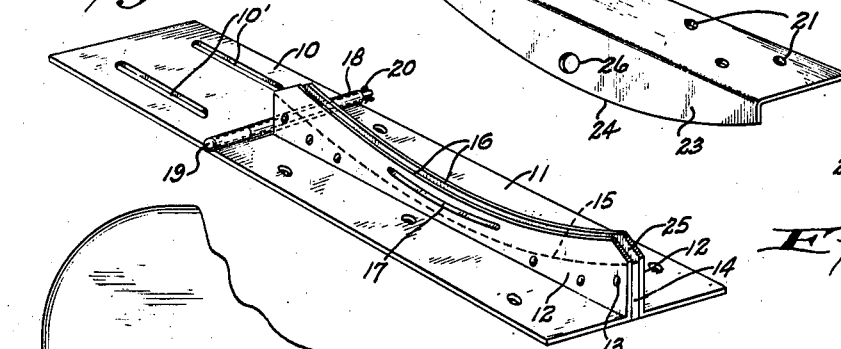
Fig. 3 is a perspective view of one of the base members alone.
Figure 7:
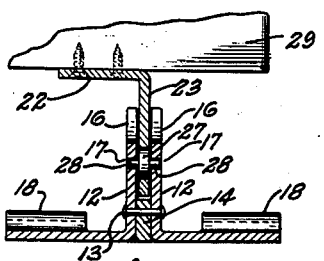
Fig. 7 is an enlarged sectional view taken on line 7—7 of Fig. 1.

The movable base portions 11 each comprise a pair of angles 12 secured to one another by bolts, rivets, or the like 13 in the manner disclosed in Figs. 3 and 7, there being a spacing filler 14 interposed between the angles through which the securing means 13 extend. The upper edge of the filler member is preferably curved as at 15, but the center portion of the filler may be omitted so that there are only local fillers at each end. With the construction as shown, however, increased strength and rigidity is obtained.

The upper edge of each of the angles 12 is preferably curved in a corresponding manner to the curve of the filler block as indicated at 16. The angles 12 are further provided with registering curved slots 17. The curvature of the slots 17 is preferably uniform, but it may be irregular depending upon requirements, and the line of curvature of the slots preferably controls the edge curvatures 15 of the filler end 16 of the angles.

The movable base portions 11 are secured to the base portions 10 by means of a hinge structure 18 consisting of cooperating metal loops for the reception of a pin 19, which pin may be removably held in position by a cotter pin 20.

Figure 4:
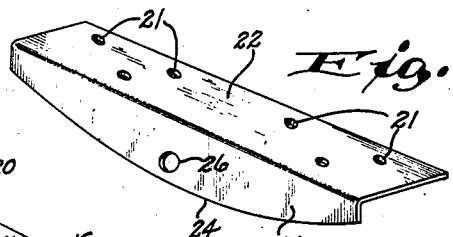
Fig. 4 is a perspective view showing one of the seat plates constructed for cooperation with the base member.
Figure 5:
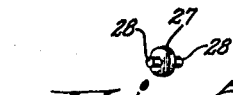
Fig. 5 is a perspective view of the retainer studs.
Figure 6:
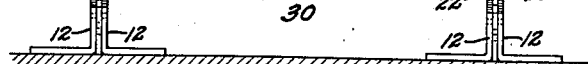
Fig. 6 is a rear view of the seat structure.

Secured to the bottom of each seat adjacent opposite side edges thereof by means of screws or the like extending through apertures 21 are metallic angle members 22 (see Figs. 4, 5, and 6). Each angle member has a depending flange 23 provided with a lower edge portion 24 which is curved to coincide with the curvature 15 of the filler block 14, the said depending flanges being snugly received in the space 25 between the angle members 12 and above the filler block 14.

Each depending flange 23 is preferably formed with a circular aperture 26 within which a roller 27 is loosely positioned, the said roller being substantially the same thickness as the metal forming the flange 23. Each roller has integral studs 28 projecting from both sides thereof, which studs are adapted to ride in the slots 17 in the manner shown in Fig. 7.

From the above it is clear that when the driver is seated on the seat 29, that his weight together with the weight of the seat will act on the studs 28 and roller 27 to frictionally hold the seat in a desired position. The amount of frictional resistance to adjustable movement may also be controlled by the spacing between the flanges 12, that is, by having the flanges 23 fit rather snugly between the flanges 12, there will be a frictional resistance to movement of the flanges 23 in the groove 25 which will serve to normally hold the seat in a desired position of adjustment. Should the driver desire to change the angular position of the seat and seat back, it is merely necessary for him to shift his body sufficiently to urge the studs 28 forwardly or rearwardly in the slot 17 against the frictional forces which tend to hold the studs in a required position. For long drives, the driver frequently desires relaxation, and by shifting the seat to the dotted line position A shown in Fig. 1, the seat is maintained in a position suitable for reclining with the back tilted rearwardly. Various intermediate positions are usually more suitable for ordinary driving conditions where the controls are frequently manipulated. The extreme rearward position indicated by the dotted line B in Fig. 1 causes a forward tilting of the seat back, and this extreme position is highly desirable as it permits the driver to get into the car with relative ease.

Figure 2:
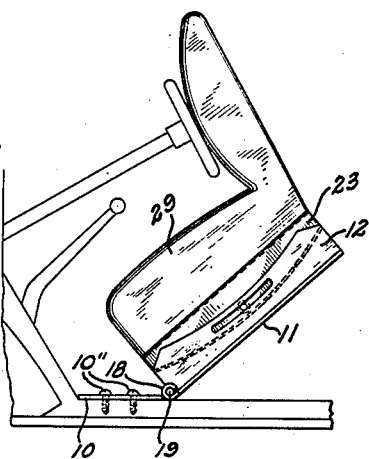
Fig. 2 is a similar view showing the seat hingedly moved to provide access to the rear of the vehicle.

By referring to Fig. 2, it will be seen that the present invention in no way interferes with the usual hinging of the seat to provide space for passage to the rear seat. The invention therefore comprehends a novel cooperation of elements wherein the entire seat structure may be either adjusted rectilinearly by movement of the slots 10' relative to the screws 10'', or angularly by movement of the seat structure proper relative to the base members 11.

By changing the curvature of the slot 17 and edge portions 15 and 16, various results may be obtained. For example, it may be desired to have one of the ends of the slot curved upwardly in an abrupt manner. For certain uses where only a rectilinear movement of the seat with respect to the base portion 11 is desired, the slot 17 may be straight. Such construction would provide a simple way of moving either of the front seats forwardly to permit entrance to the rear of the car without tipping the seat.

While the floating construction for effecting angular adjustment of the seat is preferred, it is, of course, possible to provide positive locks for maintaining the seat in a desired angular position, and it is also possible to provide a manual control for such locks.

From the above, it may be seen that the improved seat structure makes it possible for any person to obtain the maximum of comfort depending upon his particular physical build or upon the particular driving conditions.

When used in an automobile, this particular method of supporting the seats is additionally desirable because it affords a clear space 30 between the base members and beneath the seats for the circulation of air or heated air so that the usual vehicle heater will be more effective in reaching the rear of the vehicle. This space 30 also simplifies cleaning of the interior of the car and provides storage room.

The invention is obviously adapted to various types of vehicles as well as to other uses. In an aeroplane it would be particularly useful, and it would also be useful in motor busses and in launches to add to the comfort of passengers.

Although only one form of the invention has been shown, it is obvious that various modifications may be made without departing from the spirit of the invention, and all of such changes are contemplated as may come within the scope of the claims.

What I claim is:—

1. In an automotive vehicle including a steering wheel at a driver's position, a seat construction at said position comprising a seat and back rest rigidly joined and bodily movable together as a seat unit, a base unit on which said seat unit is shiftably carried, and means connecting said seat unit to said base unit for limited adjustable arcuate movement of said seat unit about a center in the vicinity of said steering wheel, including an arcuate track extending longitudinally of the vehicle and connected to one of said units and an element on said track connected to the other unit, said track and element being relatively movable so that said seat unit may be bodily shifted on said base unit to adjust it to different positions with respect to said wheel.

2. In an automotive vehicle including a steering wheel at a driver's position, a seat construction at said position comprising a seat and back rest rigidly joined and bodily movable together as a seat unit, a base unit on which said seat unit is shiftably carried, and means connecting said seat unit to said base unit for limited adjustable arcuate movement of said seat unit about a center in the vicinity of said steering wheel, including an arcuate track extending longitudinally of the vehicle and connected to one of said units and an element on said track connected to the other unit, said track and element being so arranged as to be relatively movable in response to pressure exerted on a steering wheel by a driver occupying said seat, whereby said seat unit may be bodily shifted and adjusted to different positions with respect to said wheel.

3. In an automotive vehicle including a steering wheel at a driver's position, a seat construction at said position comprising a seat and back rest joined and bodily movable together as a seat unit, a base unit on which said seat unit is carried, and means connecting said seat unit to said base unit for tilting movement about a center in the vicinity of the driver's head, said means providing for limited longitudinal movement and for a contemporaneous tilting movement of said seat to different adjusted angular positions with respect to said steering wheel so as to enable a substantial swinging of said seat unit and the body of the driver as compared to substantially little movement of the driver's head, said means being so arranged as to be responsive to a shifting pressure applied to the seat by the body of an occupant thereof to shift and swing said seat unit bodily on said base unit to adjust said seat unit to different driving positions.

WALTER A. PARKS.